United States Patent
Kim et al.

(10) Patent No.: US 9,307,255 B2
(45) Date of Patent: Apr. 5, 2016

(54) APPARATUS AND METHOD FOR ENCODING/DECODING MULTI-PLANE IMAGES USING BI-PREDICTION AND RECORDING MEDIUM USING SAME

(75) Inventors: Sunyeon Kim, Seoul (KR); Jeongyeon Lim, Gyeonggi-do (KR); Gyumin Lee, Gyeonggi-do (KR); Jaehoon Choi, Gyeonggi-do (KR); Yoonsik Choe, Gyeonggi-do (KR); Yungho Choi, Gyeonggi-do (KR); Yonggoo Kim, Seoul (KR); Jinwoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 956 days.

(21) Appl. No.: 13/514,204

(22) PCT Filed: Nov. 22, 2010

(86) PCT No.: PCT/KR2010/008225
§ 371 (c)(1),
(2), (4) Date: Aug. 13, 2012

(87) PCT Pub. No.: WO2011/071254
PCT Pub. Date: Jun. 16, 2011

(65) Prior Publication Data
US 2012/0307899 A1    Dec. 6, 2012

(30) Foreign Application Priority Data
Dec. 7, 2009    (KR) .................... 10-2009-0120688

(51) Int. Cl.
*H04N 7/12* (2006.01)
*H04N 19/186* (2014.01)
*H04N 19/105* (2014.01)
*H04N 19/176* (2014.01)
*H04N 19/593* (2014.01)
*H04N 19/11* (2014.01)

(52) U.S. Cl.
CPC .......... *H04N 19/186* (2014.11); *H04N 19/105* (2014.11); *H04N 19/11* (2014.11); *H04N 19/176* (2014.11); *H04N 19/593* (2014.11)

(58) Field of Classification Search
CPC ... H04N 19/105; H04N 19/11; H04N 19/176; H04N 19/186; H04N 19/593
USPC ....................................................... 375/240.13
See application file for complete search history.

(56) References Cited

U.S. PATENT DOCUMENTS

| | | | | |
|---|---|---|---|---|
| 8,369,416 B2 * | 2/2013 | Baik | ............... | H04N 19/895 375/240.27 |
| 2005/0157784 A1 * | 7/2005 | Tanizawa | ............. | H04N 19/105 375/240.03 |
| 2010/0034265 A1 * | 2/2010 | Kim | ............... | H04N 19/105 375/240.13 |

FOREIGN PATENT DOCUMENTS

| | | |
|---|---|---|
| KR | 10-2006-0079051 | 7/2006 |
| KR | 10-2008-0106647 | 12/2008 |
| KR | 10-2010-0018810 | 2/2010 |

OTHER PUBLICATIONS

International Search Report mailed Jul. 18, 2011 for PCT/KR2010/008225.
Byung Cheol Song; Yun Gu Lee; and Nak Hoon Kim; "Block Adaptive Inter-Color Compensation Algorithm for RGB 4:4:4 Video Coding"; IEEE CVST; pp. 1447-1451 (5 pgs); vol. 18; No. 10; Oct. 2008.
Yong-Hwan Kim; Byeongho Choi; and Joonki Paik; "High Fidelity RGB Video Coding Using Adaptive Inter-Plane Weighted Prediction"; IEEE CVST; pp. 1051-1056 (6 pgs); vol. 19; No. 7; Jul. 2009.

\* cited by examiner

*Primary Examiner* — Jessica M Prince
(74) *Attorney, Agent, or Firm* — Hauptman Ham, LLP

(57) ABSTRACT

The present disclosure relates to technology for generating an efficient predicted image by using a correlation between color planes in encoding of a multi-plane video. An apparatus for encoding a multi-plane video including two or more color planes by using a bi-prediction includes: an intra-predictor for generating a first predicted block by performing an intra-prediction on a current block of a current plane; an inter-plane predictor for generating a second predicted block by performing an inter-plane prediction; a dual-plane predictor for generating a third predicted block based on the first predicted block and the second predicted block; an optimum mode determiner for selecting one optimum predicted block having a highest encoding efficiency from the first to third predicted blocks; and an encoder or a decoder for encoding or decoding the current block based on a selected optimum predicted block.

16 Claims, 6 Drawing Sheets

APPARATUS AND METHOD FOR ENCODING/DECODING MULTI-PLANE IMAGES USING BI-PREDICTION AND RECORDING MEDIUM USING SAME

CROSS REFERENCE TO RELATED APPLICATION

This Application claims the priority of Korean Patent Application No. 10-2009-0120688, filed on Dec. 7, 2009 in the KIPO (Korean Intellectual Property Office). Further, this application is the National Phase application of International Application No. PCT/KR2010/008225 filed Nov. 22, 2010, which designates the United States and was published in Korean.

TECHNICAL FIELD

The present disclosure relates to video data encoding/decoding technology. More particularly, the present disclosure relates to an apparatus and a method for encoding/decoding a multi-plane video by using a bi-prediction for generating an efficient predicted image by using a correlation between color planes in an encoding of the multi-plane video, and a recording medium for the same.

BACKGROUND

The statements in this section merely provide background information related to the present disclosure and may not constitute prior art.

In general, all color videos are currently input and output in the RGB format. In other words, all colors may be expressed with colors of Red (R), Green (B), and Blue (B). However, the RGB format has such a high correlation between respective color channels that the compression ratio is disadvantageously low when a video is encoded in the RGB format. Accordingly, general commercial applications currently use a video format of YCbCr format, not the RGB format, in carrying out storage, transmission, and compression of a video. A method of converting the RGB format to the YCbCr format is defined in an international standard group, such as the International Telecommunication Union (ITU) or the Society of Motion Picture and Television Engineers (SMPTE). In the YCbCr, Y refers to a luminance component and Cb and Cr refer to chrominance components, and the correlation between respective color channels is substantially removed.

Most commercial applications currently use a signal in the 4:2:0 format, as well as a signal simply converted to the YCbCr format. FIG. 1 is a diagram illustrating the YCbCr 4:4:4 format, FIG. 2 is a diagram illustrating the YCbCr 4:4:2 format, and FIG. 3 is a diagram illustrating the YCbCr 4:2:0 format. According to the YCbCr 4:2:0 format, information on chrominance signals, i.e. Cb and Cr, is transversely and longitudinally sub-sampled by ½, so that the information on the chrominance signals is decreased to ¼ as illustrated in FIG. 3. This uses the fact that a person is more sensitive to a luminescence signal than a chrominance signal. Accordingly, most of the current video codecs including the MPEG-2/4, H.263, and H.264/MPEG-4 AVC basically encode and decode an input video in the YCbCr 4:2:0 format.

However, in this case, the chrominance signal of an encoded image experiences a great loss when compared to an original image. Accordingly, the professional application field, such as a digital cinema, a medical image, and an Ultra High Definition Television (UHDTV), uses the RGB 4:4:4 format or the YCbCr 4:4:4 format, not the YCbCr 4:2:0 format.

In order to support the format, the H.264/AVC AMD supports a signal processing in an RGB area with high 4:4:4 intra/predictive profiles, and includes two supportive methods. The first method is a common mode method of commonly applying an intra/inter mode which has been determined at the time of encoding a green chrominance signal, to the encoding of a blue chrominance signal and a red chrominance signal in the processing of an RGB signal. The second method is an independent mode method of independently processing each of R, G, and B signals. However, in this case, the compression ratio of an encoded image is deteriorated due to the high correlation between the R, G, and B signals as described above.

Accordingly, the high correlation between chrominance signals fundamentally exists in the RGB area, so that a research for improving the efficiency of an encoder through the removal of the correlation has been conducted.

[Document 1] Byung Cheol Song, Yun Gu Lee, and Nak Hoon Kim "Block Adaptive Inter-Color Compensation Algorithm for RGB 4:4:4 Video Coding," IEEE CYST., vol. 18, no. 10, pp. 1447-1451, October, 2008.

[Document 2] Y.-H. Kim, S.-Y. Jung, B. H. Choi and J. K. Park, "High Fidelity RGB Video coding Using Adaptive Inter-Plane Weighted Prediction," IEEE CVST., vol. 19, No. 7, pp 1051~1056, July, 2009.

In Document 1, understanding the fact that the linear relation is represented between R, G, and B signals served as an insight in the improvement of the encoding efficiency by initially encoding a G plane as illustrated in FIG. 4 and then encoding R and B planes by using information on an encoded G plane. As can be seen in FIG. 5, in Document 2, likewise to Document 1, a G plane is first encoded, a B plane to be encoded next is processed with the use of a previously encoded G plane, and an R plane is finally encoded using a previously encoded B plane, as well as the previously encoded G plane. That is, in the event of encoding the R plane, since not only the G plane but also the B plane are already encoded, the R plane is encoded by selecting the plane having the higher encoding efficiency in the two planes. In this case, the higher encoding efficiency may be achieved in Document 2 compared to the encoding of the R plane by using only the G plane in Document 1.

However, according to the aforementioned existing technology, a predicted image is generated using information on only one plane when a predicted image between planes is generated, so that the prediction efficiency is disadvantageously deteriorated.

DISCLOSURE

Technical Problem

To solve the above-mentioned problems and meet the need for a developed technology, the present disclosure mainly seeks to provide an apparatus and a method for encoding/decoding a multi-plane video by using a bi-prediction, which improves the encoding/decoding efficiency by generating a predicted image through combination of information on at least two planes in generation of the predicted image by using information on planes, and a recording medium for the same.

SUMMARY

An embodiment of the present disclosure provides an apparatus for encoding a multi-plane video including two or more color planes by using a bi-prediction, the apparatus including: an intra-predictor for generating a first predicted block by performing an intra-prediction on a current block of a current plane based on a neighboring block of the current block; an inter-plane predictor for generating a second predicted block by performing an inter-plane prediction based on a corresponding block of a reconstructed previous plane corresponding to the current block; a dual-plane predictor for generating a third predicted block based on the first predicted block and the second predicted block; an optimum mode determiner for selecting one optimum predicted block having a highest encoding efficiency from the first to third predicted blocks; and an encoder for encoding the current block based on a selected optimum predicted block.

Another embodiment of the present disclosure provides an apparatus for decoding a multi-plane video including two or more color planes by using a bi-prediction, the apparatus including: a prediction mode determiner for determining a prediction mode used in encoding of a received encoded signal, in units of blocks and based on a received side information; a predictor for generating, in accordance with a determined prediction mode, a first predicted block by performing an intra-prediction on a current block of a current plane of the received encoded signal based on a neighboring block of the current block, a second predicted block by performing an inter-plane prediction based on a corresponding block of a reconstructed previous plane corresponding to the current block, or a third predicted block based on the first predicted block and the second predicted block; and a decoder for decoding the current block based on one predicted block among the first through third predicted blocks.

A further embodiment of the present disclosure provides a method of encoding a multi-plane video including two or more color planes by using a bi-prediction, the method including: performing an intra-prediction to generate a first predicted block by performing the intra-prediction on a current block of a current plane based on a neighboring block of the current block; performing an inter-plane prediction to generate a second predicted block by performing the inter-plane prediction based on a corresponding block of a reconstructed previous plane corresponding to the current block; performing a dual-plane prediction to generate a third predicted block based on the first predicted block and the second predicted block; performing an optimum mode determination to select one optimum predicted block having a highest encoding efficiency from the first to third predicted blocks; and performing an encoding on the current block based on a selected optimum predicted block.

A still further embodiment of the present disclosure provides a method of decoding a multi-plane video including two or more color planes by using a bi-prediction, the method including: performing a prediction mode determination to determine a prediction mode used in encoding of a received encoded signal, in units of blocks and based on a received side information; performing a prediction to generate, in accordance with a determined prediction mode, a first predicted block by performing an intra-prediction on a current block of a current plane of the received encoded signal based on a neighboring block of the current block, a second predicted block by performing an inter-plane prediction based on a corresponding block of a reconstructed previous plane corresponding to the current block, or a third predicted block based on the first predicted block and the second predicted block; and performing a decoding on the current block based on one predicted block among the first through third predicted blocks.

A yet further embodiment of the present disclosure provides a non-transitory computer readable recording medium for recording a computer program for causing, when executed in a processor, the processor to perform the method of encoding the multi-plane video using the bi-prediction.

A still yet further embodiment of the present disclosure provides a non-transitory computer readable recording medium for recording a computer program for causing, when executed in a processor, the processor to perform the method of decoding the multi-plane video using the bi-prediction.

According to the embodiment of the present disclosure, when a predicted image is generated using information between the planes, the predicted image is generated by combining information on two or more planes, not one plane, so that the further improved encoding efficiency may be achieved. To this end, when there are two or more planes usable for the prediction, a first predicted image using a first plane is generated taking advantage of its relation between a block to be currently predicted, and a second predicted image is generated using a second plane. Then, a new predicted image is generated by giving a weight to each of the two predicted images and then an encoding is performed on the difference between the new predicted image and the image to be encoded.

In other words, since the embodiment of the present disclosure performs where the first plane has been already encoded and becomes applicable to blocks of the second and later planes, a plane to be second encoded and a plane to be third encoded may be the input. In general, since an RGB image is encoded in the order of G, B, and R signals, the G signal to be firstly encoded is processed by using only information on the G plane without information on an inter-plane prediction. Then, the B plane is encoded using information on the B plane and the information on the G plane. The information on the G plane is used by way of the inter-plane prediction. Finally, the R plane is encoded, and the R plane is encoded by using the information on the R plane and both the information on the G plane and the B plane. The information on the G plane and the B plane is used according to the inter-plane prediction method. Accordingly, the predicted images are generated in the two or more planes and the new predicted image is generated with the sum of the weights of the predicted images, so that the embodiment of the present disclosure is adapted for application to the second and later planes in the order of encoding. That is, if the RGB input image is encoded in an order of G, B, and R signals, the embodiment of the present disclosure may be applied to the B plane and the R plane.

Advantageous Effects

According to various aspects of the present disclosure as described above, since the present disclosure generates the predicted image with the combination of the information on at least two planes, the present disclosure improves the efficiency of the prediction between the planes through use of an image having a high redundancy between the planes in encoding the input video of the RGB and the YCbCr 4:4:4 format, thereby achieving the improved encoding efficiency.

DETAILED DESCRIPTION

Figure 1:
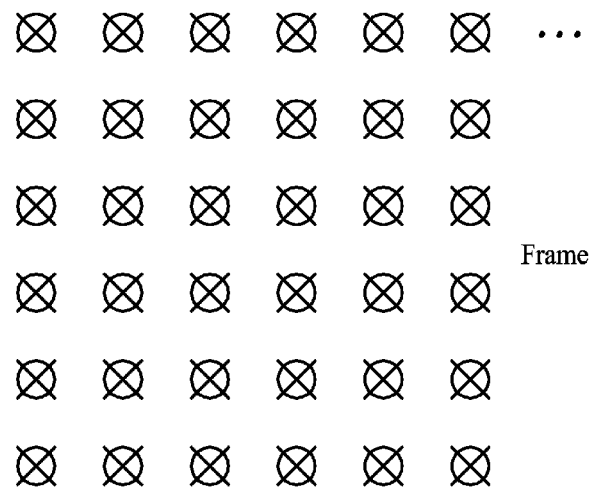
FIGS. 1 to 3 are diagrams illustrating the YCbCr 4:4:4 format, the YCbCr 4:4:2 format, and the YCbCr 4:2:0 format, respectively.
Figure 2:
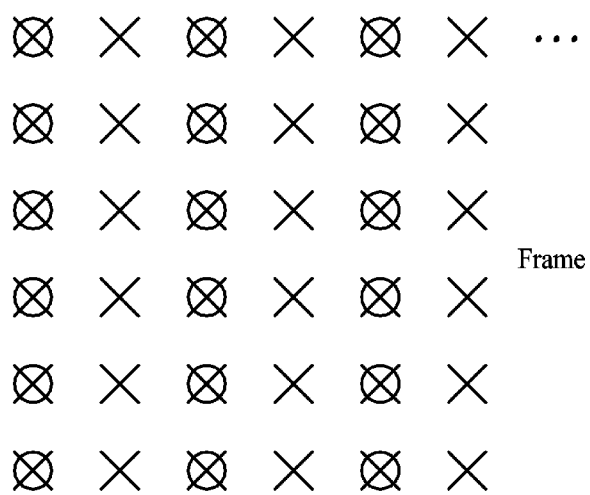
Figure 3:
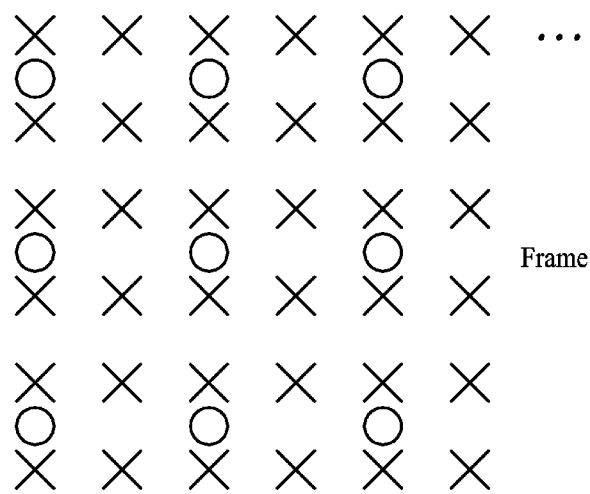
Figure 4:
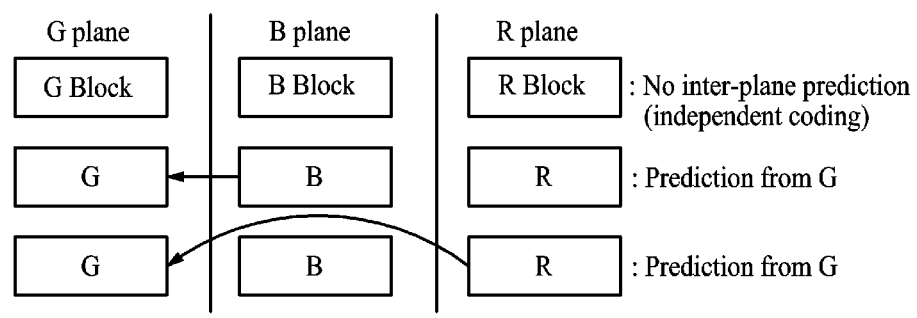
FIG. 4 is a diagram illustrating a concept of a general inter-plane prediction.
Figure 5:
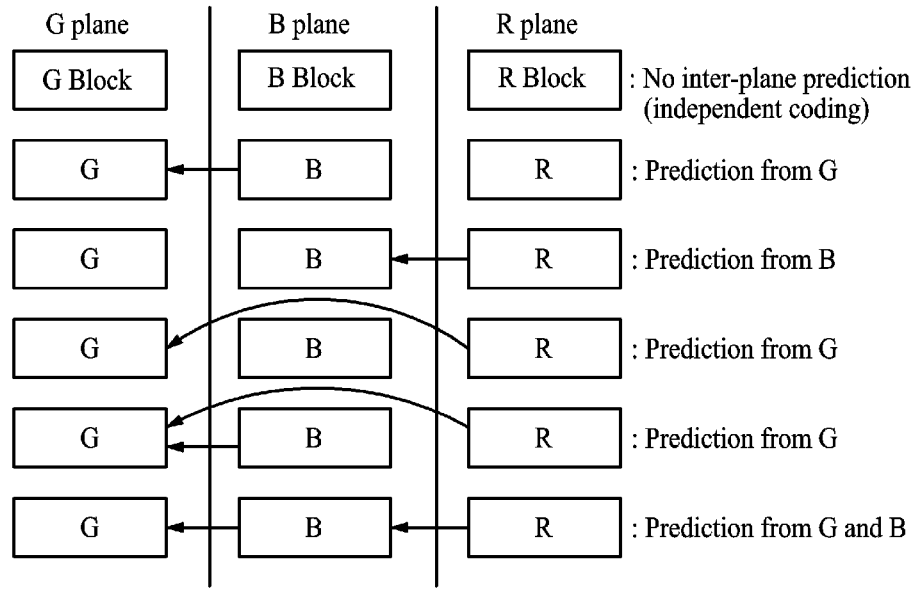
FIG. 5 is a diagram illustrating a concept of an improved inter-plane prediction.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 6:
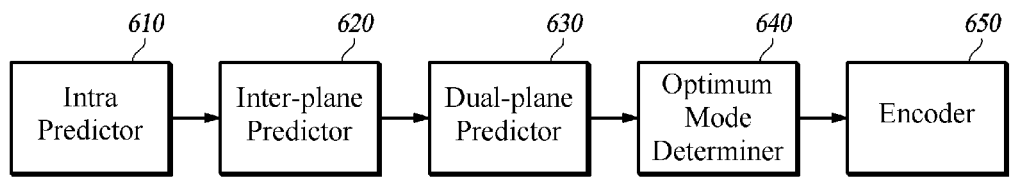
FIG. 6 is a block diagram illustrating a multi-plane video encoding apparatus using a bi-prediction according to an embodiment of the present disclosure.

FIG. 6 is a block diagram illustrating a multi-plane video encoding apparatus using a bi-prediction according to an embodiment of the present disclosure. As illustrated in FIG. 6, the multi-plane video encoding apparatus includes an intra-predictor 610, an inter-plane predictor 620, a dual-plane predictor 630, an optimum mode determiner 640, and an encoder 650.

The intra-predictor 610 generates a first predicted block by performing an intra-prediction on a current block of a current plane based on neighboring blocks of the current block.

The inter-plane predictor 620 generates a second predicted block by using a correlation between a corresponding block of a reconstructed previous plane corresponding to the current block of the current plane and the current plane, i.e. by performing an inter-plane prediction.

The dual-plane predictor 630 generates a third predicted block based on the first predicted block generated by the intra-predictor 610 and the second predicted block generated by the inter-plane predictor 620. For example, the dual-plane predictor 630 generates the third predicted block by giving a weight to each of the first predicted block and the second predicted block and adding the first predicted block and the second predicted block. In this event, a sum of the weight of the first predicted block and the weight of the predicted block is "1". For another example, when there are two or more reconstructed previous planes corresponding to the current plane, the dual-plane predictor 630 may generate the third predicted block, by setting a weight of the first predicted block generated by the intra-predictor 610 to "0" and giving a weight to each of two or more second predicted blocks such that a sum of respective weights of the two or more second predicted blocks corresponding to the two or more previous planes generated by the inter-plane predictor 620 becomes "1" and adding the weighted two or more predicted blocks.

The optimum mode determiner 640 selects a single optimum predicted block having the highest encoding efficiency compared to the current block from the first predicted block generated by the intra-predictor 610, the second predicted block generated by the inter-plane predictor 620, and the third predicted block generated by the dual-plane predictor 630. In this case, the encoding efficiency may be calculated based on, for example, a rate-distortion optimization method.

The encoder 650 encodes the current block based on the optimum predicted block selected by the optimum mode determiner 640.

Figure 7:
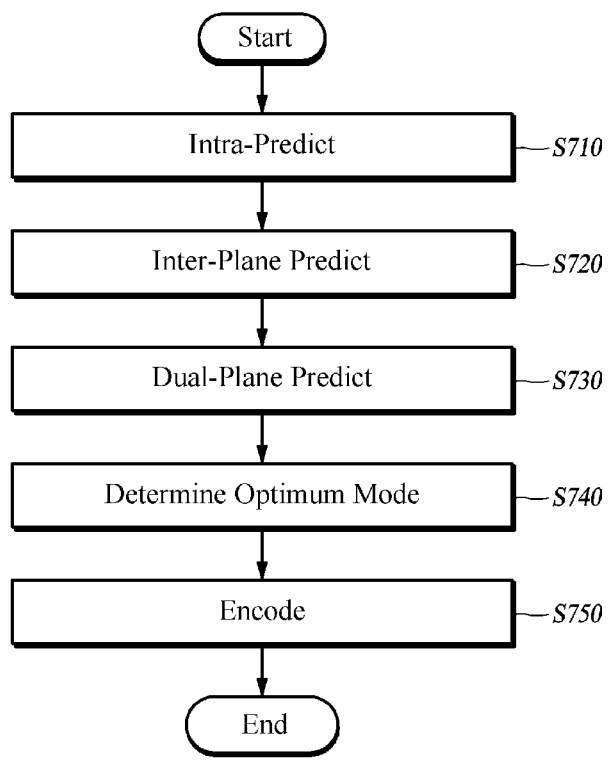
FIG. 7 is a flowchart illustrating a multi-plane video encoding method using a bi-prediction according to an embodiment of the present disclosure.

FIG. 7 is a flowchart illustrating a multi-plane video encoding method using a bi-prediction according to an embodiment of the present disclosure. As illustrated in FIG. 7, the multi-plane video encoding method using the bi-prediction includes an intra-prediction step S710, an inter-plane prediction step S720, a dual-plane prediction step S730, an optimum mode determination step S740, and an encoding step S750. The multi-plane video encoding apparatus using the bi-prediction is applied to the apparatus of FIG. 6 as an example, so that the multi-plane video encoding method will be described together with the operation of the multi-plane video encoding apparatus.

Intra-Prediction Step S710

First, at the intra-prediction step S710, upon receiving a multi-plane video including two or more color planes, the intra-predictor 610 generates a first predicted block by performing the intra-prediction on a current block of an input current plane based on a neighboring block of the current block.

Inter-Plane Prediction Step S720

Next, at the inter-plane prediction step S720, the inter-plane predictor 620 generates a second predicted block by using a correlation between a corresponding block of a reconstructed previous plane corresponding to the current block of the current plane and the current plane, i.e. by performing an inter-plane prediction.

Dual-Plane Prediction Step S730

Subsequently, at the dual-plane prediction step S730, the dual-plane predictor 630 generates a third predicted block based on the first predicted block generated by the intra-predictor 610 and the second predicted block generated by the inter-plane predictor 620. For example, the dual-plane predictor 630 generates the third predicted block by giving a weight to each of the first predicted block and the second predicted block and adding the first predicted block and the second predicted block. In this event, the weight is given such that a sum of the weight of the first predicted block and the weight of the predicted block is "1". For another example, when there are two or more reconstructed previous planes corresponding to the current plane, the dual-plane predictor 630 may generate the third predicted block by setting a weight of the first predicted block generated by the intra-predictor 610 to "0" and giving a weight to each of two or more second predicted blocks such that a sum of respective weights of the two or more second predicted blocks generated by the inter-plane predictor 620 in correspondence with the two or more previous planes becomes "1" and adding the weighted two or more predicted blocks.

Optimum Mode Determination Step S740

Next, at the optimum mode determination step S740, the optimum mode determiner 640 selects a single optimum predicted block having the highest encoding efficiency compared to the current block from the first predicted block generated by the intra-predictor 610, the second predicted block generated by the inter-plane predictor 620, and the third predicted block generated by the dual-plane predictor 630. In this case, the encoding efficiency may be calculated based on, for example, a rate-distortion optimization method.

Encoding Step S750

Lastly, at the encoding step S750, the encoder 650 encodes the current block based on the optimum predicted block selected by the optimum mode determiner 640.

Hereinafter, an operation/effect of the apparatus of FIG. 6 and a detailed process of the method of FIG. 7 corresponding thereto will be described in detail.

The embodiment of the present disclosure will be described based on the application to the intra encoding of the currently newest video encoding/decoding method, the H.264. That is, it is premised that all frames are encoded into intra frames of the H.264.

According to the embodiment of the present disclosure, the intra frame of the H.264 is intra-predicted with three types of intra-prediction (or called "prediction within an image") to be followed in order to improve the encoding efficiency. That is, the H.264 includes a 4×4 intra-prediction mode, an 8×8 intra-prediction mode, and a 16×16 intra-prediction mode, and an encoding is performed with one of the three types of intra-prediction modes. The inter-plane prediction has not been defined in the current standard of the H.264, but the inter-plane prediction is performed in units of 4×4 blocks, 8×8 blocks, and 16×16 blocks according to the embodiment of the present disclosure. Accordingly, a bi-prediction is also performed in units of 4×4 blocks, 8×8 blocks, and 16×16 blocks in the present disclosure. In the embodiment of the present disclosure, the bi-prediction means that a prediction is performed by using information on two or more planes in one block. However, the size of a block for the suggested bi-prediction is not limited to the above mentioned sizes of the blocks.

In the present embodiment, it is premised that an input video is in RGB 4:4:4: format and encoding orders of respective planes is G, B, and R, but the input video is not limited to the RGB and the encoding is not limited to the above mentioned order. In the present embodiment, an input plane is one block in a B plane or an R plane.

An intra-prediction is performed by using information on a neighboring block of an input macro block in the intra-predictor 610 or the intra-prediction step S710 according to the embodiment of the present disclosure. The intra-prediction includes the 4×4 intra-prediction mode, the 8×8 intra-prediction mode, and the 16×16 intra-prediction mode as mentioned above, and stores respective predicted blocks generated according to the respective intra-prediction modes.

Figure 8:
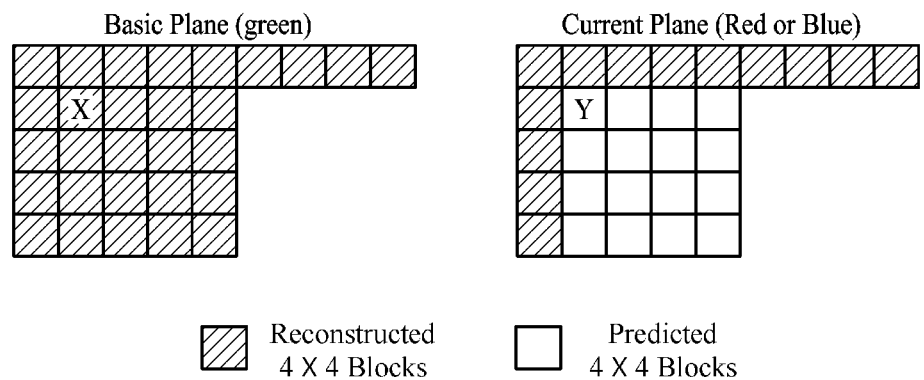
FIG. 8 illustrates a current plane and a reconstructed previous plane according to an embodiment of the present disclosure.

A current block is predicted by using information on a block of another plane positioned at the same position as that of the current block in the inter-plane predictor 620 or the inter-plane prediction step S720 according to the embodiment of the present disclosure. For example, as illustrated in FIG. 8, when it is assumed that the current block of a current plane is block Y and a corresponding block of the previous plane positioned at the same position as that of the current block of the current plane is block X, the block Y is predicted by using the block X. The linear prediction is as defined in Equation 1.

$$\hat{Y}=wX+o \quad \text{Equation 1}$$

Figure 9:
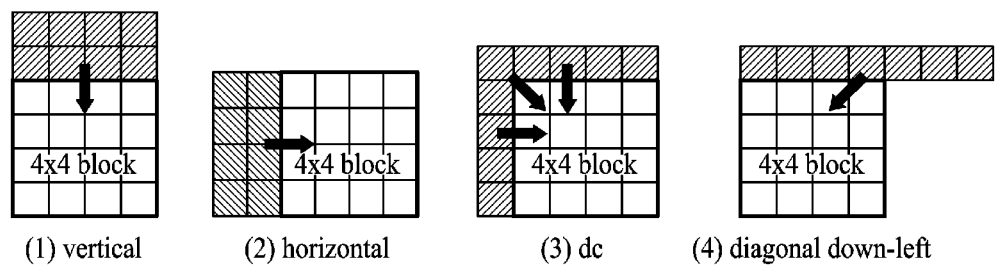
FIG. 9 illustrates an example of an inter-plane prediction mode according to an embodiment of the present disclosure.

In Equation 1, $\hat{Y}$ is a value obtained through a linear prediction using the block X, and used for prediction of the block Y. In this event, w and o are linear parameters and obtained using a relation between neighboring blocks of the block X and the block Y. For example, as illustrated in FIG. 9, positions of samples for determination of w and o in the neighboring blocks are set to 4 positions in a vertical direction, a horizontal direction, a dc direction, and a diagonal down-left direction. Accordingly, w and o for each sample may be obtained and a total of 4 predicted images having undergone the 4 inter-plane predictions may be generated. That is, the 4 predicted images for every plane to be predicted are generated by inter-plane predicting the plane with the four schemes. Here, four types of inter-plane predicted blocks may be generated because the prediction is performed by using only the G plane in the case of a block in the B plane, and four types of predicted blocks in the G plane and four types of predicted blocks in the B plane in the case of the R plane may be generated. According to the embodiment of the present disclosure, four predicted images may be generated for each of the 4×4 blocks, 8×8 blocks, or 16×16 blocks in each plane.

A newly predicted block is generated by combining the block generated in the intra-predictor 610 or the intra-prediction step S710 and the block generated in the inter-plane predictor 620 or the inter-plane prediction step S720, at the dual-plane predictor 630 or the dual-plane prediction step S730. That is, in the case where the input is a block in the B plane, nine intra-predicted blocks and four inter-plane predicted blocks are generated in the case of the 4×4 blocks through the intra-prediction within the B plane. Here, the new predicted block may be generated by using information on the intra-predicted block and the inter-predicted plane according to Equation 2.

$$\hat{Y}_{Sum}(i,j)=\alpha \times \hat{Y}_{INT}(i)+(1-\alpha) \times \hat{Y}_{INP,G}(j) \quad \text{Equation 2}$$

In Equation 2, $\hat{Y}_{INT}(i)$ is an image generated through the intra-prediction and represents that the $i^{th}$ prediction method has been used. Since the 4×4 intra-prediction mode includes a total of 9 prediction methods, i may have a value from 0 to 8. Since the 8×8 intra-prediction mode includes a total of 9 prediction methods, i may have a value from 0 to 8. Since the 16×16 intra-prediction mode includes a total of 4 prediction methods, i may have a value from 0 to 3. $\hat{Y}_{INP,G}(j)$ means a predicted block obtained through the inter-plane prediction according to the $j^{th}$ method using information on the G plane. Since the inter-plane prediction method includes the four methods as mentioned above, j has a value from 0 to 3. In this case, the 4×4 prediction mode, the 8×8 prediction mode, and the 16×16 prediction mode have the same four types of inter-plane prediction modes. Further, α, which is a weight, has a value from 0 to 1, and is set to 0.5 in the present embodiment, but is not limited thereto. $\hat{Y}_{Sum}(i,j)$ means the new predicted block generated using the intra-prediction and the inter-plane prediction. Various newly predicted blocks, $\hat{Y}_{Sum}(i,j)$, may be generated according to the intra-prediction method and the inter-plane prediction method, and a total of 36 newly predicted blocks are generated in the case of the 4×4 blocks and the 8×8 blocks, and a total of 16 newly predicted blocks are generated in the case of the 16×16 blocks.

Since there may be too many bits for indicating the number of predicted blocks due to the presence of an excessively large number of newly generated predicted blocks, a part of the newly generated predicted blocks may be selected from the predicted blocks newly generated as described above and used as the newly predicted blocks.

In a case where the input is the R plane, the new predicted block may be expressed as Equation 3.

$$\hat{Y}_{Sum}(i,j,k) = \alpha \times \hat{Y}_{INT}(i) + \beta \times \hat{Y}_{INO,G}(j) + \gamma \times \hat{Y}_{INP,B}(k) \quad \text{Equation 3}$$

The inter-plane prediction may be performed on the B plane, as well as the G plane. $\hat{Y}_{INP,B}(k)$ means an image generated through the inter-plane prediction in the B plane and may have a value from 0 to 3. A sum of weights is 1, i.e. $\alpha+\beta+\gamma=1$. The number of input blocks newly generable in the R plane is 144, i.e. 9×4×4, in the case of the 4×4 blocks, 144, i.e. 9×4×4, in the case of the 8×8 blocks, and 64, i.e. 4×4×4, in the case of the 16×16 blocks. Since there are too many predicted blocks, the large number of bits for indicating prediction information is required. In order to reduce the number of bits, the intra-prediction mode may not be used in the generation of the new predicted blocks in the case of the R plane in the present embodiment. Accordingly, α is 0, so that Equation 3 is expressed as Equation 4 below.

$$\hat{Y}_{Sum}(j,k) = \beta \times \hat{Y}_{INP,G}(j) + (1-\beta) \times \hat{Y}_{INP,B}(k) \quad \text{Equation 4}$$

In Equation 4, β has a value from 0 to 1, and is set to 0.5 in the present embodiment, but is not necessarily limited thereto. In the case of Equation 4, the number of predicted blocks newly generated for the R plane may be limited to 16. That is, 16 newly predicted blocks are generated in the 4×4 blocks, the 8×8 blocks, and the 16×16 bocks.

An optimum predicted block similar to an original image is searched for in the generated predicted blocks by the optimum mode determiner 640 or at the optimum mode determination step S740 according to the embodiment of the present disclosure. That is, a single predicted block having the highest encoding efficiency is searched for in all predicted blocks generated at the intra-predictor 610 or the intra-prediction step S710, the inter-plane predictor 620 or the inter-plane prediction step S720, and the dual-plane predictor 630 or the dual-plane prediction step S730. For example, when the input is the 4×4 block of the R plane, nine types of intra-prediction modes are generated in the intra-predictor 610 or the intra-prediction step S710, eight types of inter-plane prediction modes are generated in the inter-plane predictor 620 or the inter-plane prediction step S720, and 16 types of bi-prediction modes are generated in the dual-plane predictor 630 or the dual-plane prediction step S730. Accordingly, 33 predicted blocks are generated according to a total of 33 types of prediction modes according to the present embodiment, and a block of the prediction mode having the highest encoding efficiency is selected from the 33 predicted blocks at the optimum mode determiner 640 or the optimum mode determination step S740. A predicted block causing Equation 5 to have a smallest value may be determined as a final predicted block for the current 4×4 blocks through a selection method, such as a rate-distortion optimization method. The same method is applied to the 8×8 blocks and the 16×16 bocks.

$$J(i) = D(i) + \lambda R(i) \quad \text{Equation 5}$$

In Equation 5, R(i) represents a bit generated in the performance of the encoding using the $i^{th}$ prediction method, D(i) represents a distortion between an decoded image obtained through the decoding with the encoded bit and the original image, and λ, which is a lagrange multiplier, is a constant. Since there are total of 33 prediction modes, i may have a value from 0 to 32, and i having the smallest cost J among the 33 prediction modes is the optimum mode of the 4×4 blocks.

An actual encoding is performed by using the optimum predicted block selected at the optimum mode determiner 640 or the optimum mode determination step S740, at the encoder 650 or the encoding step S750 according to the embodiment of the present disclosure.

Figure 10:
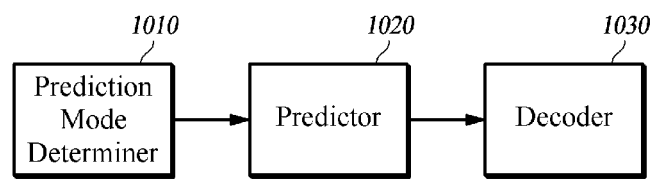
FIG. 10 is a block diagram illustrating a multi-plane video decoding apparatus using a bi-prediction according to an embodiment of the present disclosure.

FIG. 10 is a block diagram illustrating a multi-plane video decoding apparatus using a bi-prediction according to an embodiment of the present disclosure. As illustrated in FIG. 10, the multi-plane video decoding apparatus includes a prediction mode determiner 1010, a predictor 1020, and a decoder 1030.

The prediction mode determiner 1010 determines a prediction mode of a received encoded signal used in the encoding in units of blocks based on a received side information. For example, the prediction mode determiner 1010 may determine if a current block of the received encoded signal is encoded according to the intra-prediction mode, the inter-plane prediction mode, or the dual-plane prediction mode based on the received side information.

The predictor 1020 generates a predicted block by performing a prediction according to a prediction mode determined in the prediction mode determiner 1010. The predictor 1020 generates a first predicted block by performing the intra-prediction on the current block of a current plane of the received encoded signal based on a neighboring block of the current block when the determined mode is the intra-prediction mode, generates a second predicted block by performing the inter-plane prediction based on a corresponding block of a reconstructed previous plane corresponding to the current block when the determined mode is the inter-plane prediction mode, or generates a third predicted block based on the first predicted block and the second predicted block when the determined mode is the dual-plane prediction mode. That is, the predictor 1020 generates the first predicted block by performing the intra-prediction based on the neighboring block of the current block for the current block of the current plane in the intra-prediction mode, and the predictor 1020 generates the second predicted block by using a correlation between the corresponding block of the reconstructed previous plane corresponding to the current block of the current plane and the current plane, i.e. by performing the inter-plane prediction, in the inter-plane prediction mode. Further, the predictor 1020 generates the third predicted block based on the first predicted block generated according to the intra-prediction mode and the second predicted block generated according to the inter-plane prediction mode in the dual-plane prediction mode. For example, the predictor 1020 generates the third predicted block by giving a weight to each of the first predicted block and the second predicted block and adding the first predicted block and the second predicted block. In this event, the weight is given such that a sum of the weight of the first predicted block and the weight of the second predicted block is "1". For another example, in the dual-plane prediction mode, when there are two or more reconstructed previous planes corresponding to the current plane, the predictor 1020 may generate the third predicted block, by setting a weight of the first predicted block generated according to the intra-prediction mode to "0" and giving a weight to each of two or more second predicted blocks such that a sum of respective weights of the two or more second predicted blocks corresponding to the two or more previous planes generated according to the inter-plane prediction mode becomes "1" and adding the weighted two or more predicted blocks.

The decoder 1030 decodes the current block based on one predicted block among the first to third predicted blocks generated by the predictor 1020.

Figure 11:
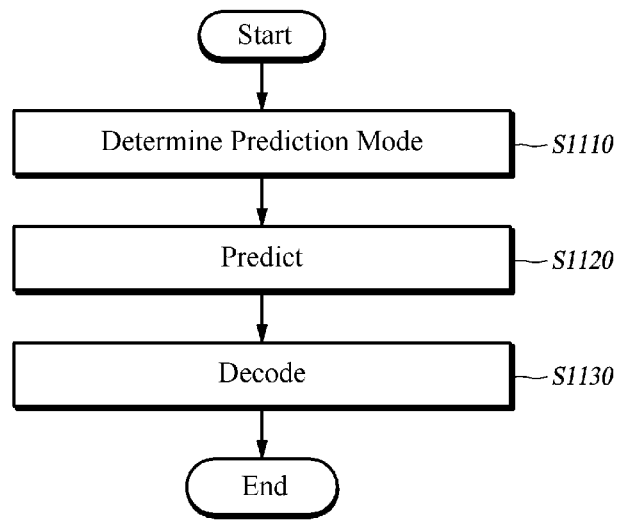
FIG. 11 is a flowchart illustrating a multi-plane video decoding method using a bi-prediction according to an embodiment of the present disclosure.

FIG. 11 is a flowchart illustrating a multi-plane video decoding method using a bi-prediction according to an embodiment of the present disclosure. As illustrated in FIG. 11, the multi-plane video decoding method includes a prediction mode determination step S1110, a prediction step S1120, and a decoding step S1130, and is applied to the multi-plane video decoding apparatus of FIG. 10 as an example, so that it will be described together with the operation of the multi-plane video decoding apparatus.

Prediction Mode Determination Step S1110

First, in the prediction mode determination step S1110, the prediction mode determiner 1010 may determine if a current block of a received encoded signal is encoded according to the intra-prediction mode, the inter-plane prediction mode, or the dual-plane prediction mode based on a received side information.

Prediction Step S1120

Next, in the prediction step S1120, the predictor 1020 generates a first predicted block by performing the intra-prediction on the current block of a current plane of the received corresponding encoded signal based on a neighboring block of the current block when a mode determined in the prediction mode determination step S1110 is the intra-prediction mode, generates a second predicted block by performing the inter-plane prediction based on a corresponding block of a reconstructed previous plane corresponding to the current block when a mode determined in the prediction mode determination step S1110 is the inter-plane prediction mode, or generates a third predicted block based on the first predicted block and the second predicted block when a mode determined in the prediction mode determination step S1110 is the dual-plane prediction mode. That is, the predictor 1020 generates the first predicted block by performing the intra-prediction based on the neighboring block of the current block for the current block of the current plane in the intra-prediction mode, and the predictor 1020 generates the second predicted block by using a correlation between the corresponding block of the reconstructed previous plane corresponding to the current block of the current plane and the current plane, i.e. by performing the inter-plane prediction, in the inter-plane prediction mode. Further, the predictor 1020 generates the third predicted block based on the first predicted block generated according to the intra-prediction mode and the second predicted block generated according to the inter-plane prediction mode in the dual-plane prediction mode. For example, the predictor 1020 generates the third predicted block by giving a weight to each of the first predicted block and the second predicted block and adding the first predicted block and the second predicted block. In this event, the weight is given such that a sum of the weight of the first predicted block and the weight of the second predicted block is "1". For another example, in the dual-plane prediction mode, when there are two or more reconstructed previous planes corresponding to the current plane, the predictor 1020 may generate the third predicted block, by setting a weight of the first predicted block generated according to the intra-prediction mode to "0" and giving a weight to each of two or more second predicted blocks such that a sum of respective weights of the two or more second predicted blocks corresponding to the two or more previous planes generated according to the inter-plane prediction mode becomes "1" and adding the weighted two or more predicted blocks.

Decoding Step S1130

Finally, in the decoding step S1130, the decoder 1030 decodes the current block based on one predicted block among the first to third predicted blocks generated by the predictor 1020.

The multi-plane video encoding method using the bi-prediction according to the embodiment of the present disclosure described with reference to FIG. 7 and the multi-plane video decoding method using the bi-prediction according to the embodiment of the present disclosure described with reference to FIG. 11 may be implemented by a computer readable recording medium including program commands for performing various operations executed by a computer, respectively. The computer readable recording medium may include separate or a combination of program commands, a local data file, a local data structure, etc. The computer readable recording medium may be specially designed and configured for the embodiment of the present disclosure, or may be publicly known to and available to one skilled in a computer software field. An example of the computer readable recording medium includes a magnetic medium including a hard disk, a floppy disk, and a magnetic disk, an optical recording medium including CD-ROM and DVD, a magnetic-optical medium including a floptical disk, and a hardware device including ROM, RAM, and flash memory specially configured for storage and execution of program commands. The computer readable recording medium may be a transmission medium, such as optical or metal lines and a waveguide including a carrier for transmitting a signal designating a program command, a local data structure, etc. An example of the program command may include a high-level language code executable by a computer by using an interpreter, etc., as well as a machine code created by a compiler.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of video data compression technology, especially, the multi-plane video encoding/decoding technology, by improving the efficiency of the prediction between the planes through use of an image having a high redundancy between the planes in encoding the input video of the RGB and the YCbCr 4:4:4 format because the present disclosure generates the predicted image with the combination of the information on at least two planes, thereby achieving the improved encoding efficiency.

The invention claimed is:

1. An apparatus for encoding a multi-plane video including two or more color planes by using a bi-prediction, the apparatus comprising:
   an intra-predictor configured to generate a first predicted block of a current block of a current plane by performing an intra-prediction on the current block based on one or more neighboring blocks of the current block;
   an inter-plane predictor configured to generate two or more a second predicted blocks of the current block by performing an inter-plane prediction based on two or more corresponding blocks of two or more reconstructed previous planes corresponding to the current block, wherein a position of each of the two or more corresponding blocks in the two or more reconstructed previous planes corresponds to a position of the current block in the current plane;
   a dual-plane predictor configured to generate a third predicted block of the current block based on the first predicted block and the two or more second predicted blocks;
   an optimum mode determiner configured to select a predicted block of the current block from among the first predicted block, the two or more second predicted blocks, and the third predicted block; and
   an encoder configured to encode the current block based on the selected predicted block,
   wherein the dual-plane predictor is configured to generate the third predicted block by
      giving a weight to the first predicted block and each of weights to each of the two or more second predicted blocks, and
      adding the weighted first predicted block and each of the two or more weighted second predicted blocks.

2. The apparatus of claim 1, wherein a sum of the weight of the first predicted block and said each of the weights of the two or more second predicted blocks is "1".

3. The apparatus of claim 1, wherein the dual-plane predictor is configured to generate the third predicted block by setting the weight of the first predicted block to "0".

4. The apparatus of claim 1, wherein the optimum mode determiner is configured to select the predicted block having a highest encoding efficiency from among the first predicted block, the two or more second predicted blocks, and the third predicted block,
   wherein the encoding efficiency is calculated based on a rate-distortion optimization method.

5. An apparatus for decoding a multi-plane video including two or more color planes by using a bi-prediction, the apparatus comprising:
   a prediction mode determiner configured to determine a prediction mode of a current block of a current plane based on a received side information;
   a predictor configured to generate, in accordance with the determined prediction mode, one of:
      a first predicted block of the current block by performing an intra-prediction on the current block based on one or more neighboring blocks of the current block,
      two or more second predicted blocks of the current block by performing an inter-plane prediction based on two or more corresponding blocks of two or more reconstructed previous planes corresponding to the current block, wherein a position of each of the two or more corresponding blocks in the two or more reconstructed previous planes corresponds to a position of the current block in the current plane, and
      a third predicted block of the current block based on the first predicted block and the two or more second predicted blocks, after producing the first predicted block and the two or more second predicted blocks; and
   a decoder configured to decode the current block based on a generated predicted block among the first predicted block, the two or more second predicted blocks, and the third predicted block,
   wherein the predictor is configured to generate the third predicted block by
      giving a weight for the first predicted block and each of weights for each of the two or more second predicted blocks, and
      adding the weighted first predicted block and each of the two or more weighted second predicted blocks.

6. The apparatus of claim 5, wherein a sum of the weight of the first predicted block and said each of the weights of the two or more second predicted blocks is "1".

7. The apparatus of claim 5, wherein the predictor is configured to generate the third predicted block by setting the weight of the first predicted block to "0".

8. A method of encoding a multi-plane video including two or more color planes by using a bi-prediction, the method comprising:
   generating a first predicted block of a current block of a current plane by performing an intra-prediction on the current block based on one or more neighboring blocks of the current block;
   generating two or more second predicted blocks of the current block by performing an inter-plane prediction based on two or more corresponding blocks of two or more reconstructed previous planes corresponding to the current block, wherein a position of each of the two or more corresponding blocks in the two or more reconstructed previous planes corresponds to a position of the current block in the current plane;
   generating a third predicted block of the current block based on the first predicted block and the two or more second predicted blocks;
   selecting a predicted block of the current block from among the first predicted block, the two or more second predicted blocks, and the third predicted block; and
   encoding the current block based on the selected predicted block,
   wherein the third predicted block is generated by
      giving a weight to the first predicted block and each of weights to each of the two or more second predicted blocks, and
      adding the weighted first predicted block and each of the two or more weighted second predicted blocks.

9. The method of claim 8, wherein a sum of the weight of the first predicted block and said each of the weights of the two or more second predicted blocks is "1".

10. The method of claim 8, wherein the third predicted block is generated by setting the weight of the first predicted block to "0".

11. The method of claim 8, wherein the selecting of the predicted block comprises: selecting the predicted block having a highest encoding efficiency from among the first predicted block, the two or more second predicted blocks, and the third predicted block, wherein the encoding efficiency is calculated based on a rate-distortion optimization method.

12. A method of decoding a multi-plane video including two or more color planes by using a bi-prediction, the method comprising:

determining a prediction mode of a current block of a current plane based on a received side information;

generating, in accordance with the determined prediction mode, one of:

a first predicted block of the current block by performing an intra-prediction on the current block based on one or more neighboring blocks of the current block, two or more second predicted blocks of the current block by performing an inter-plane prediction based on two or more corresponding blocks of two or more reconstructed previous planes corresponding to the current block, wherein a position of each of the two or more corresponding blocks in the two or more reconstructed previous planes corresponds to a position of the current block in the current plane, and a third predicted block of the current block based on the first predicted block and the two or more second predicted blocks, after producing the first predicted block and the two or more second predicted blocks; and decoding the current block based on a generated predicted block among the first predicted block, the two or more second predicted blocks, and the third predicted block, wherein the third predicted block is generated by giving a weight to the first predicted block and each of weights to each of the two or more second predicted blocks, and adding the weighted first predicted block and each of the two or more weighted second predicted blocks.

13. The method of claim 12, wherein a sum of the weight of the first predicted block and said each of the weights of the two or more second predicted blocks is "1".

14. The method of claim 12, wherein the third predicted block is generated by setting the weight of the first predicted block to "0".

15. A non-transitory computer readable recording medium for recording a computer program for causing, when executed in a processor, the processor to perform the method of encoding the multi-plane video using the bi-prediction of claim 8.

16. A non-transitory computer readable recording medium for recording a computer program for causing, when executed in a processor, the processor to perform the method of decoding the multi-plane video using the bi-prediction of claim 12.

* * * * *